United States Patent
Breer et al.

(10) Patent No.: US 10,902,690 B2
(45) Date of Patent: Jan. 26, 2021

(54) METHOD FOR ACTIVATING OF AT LEAST ONE SECURITY FUNCTION OF A SECURITY SYSTEM OF A VEHICLE

(71) Applicant: Huf Hülsbeck & Fürst GmbH & Co. KG, Velbert (DE)

(72) Inventors: Jan Breer, Essen (DE); Marc Feldsieper, Hattingen (DE); Matthias Ihln, Düsseldorf (DE); Stefan Neuhoff, Essen (DE); Mirko Schindler, Velbert (DE); Thomas Skaletz, Meerbusch (DE); Boris Ziller, Ratingen (DE)

(73) Assignee: Huf Hülsbeck & Fürst GmbH & Co. KG, Velbert (DE)

(*) Notice: Subject to any disclaimer, the term of this patent is extended or adjusted under 35 U.S.C. 154(b) by 7 days.

(21) Appl. No.: 16/080,009

(22) PCT Filed: Feb. 16, 2017

(86) PCT No.: PCT/EP2017/053555
§ 371 (c)(1),
(2) Date: Aug. 26, 2018

(87) PCT Pub. No.: WO2017/144349
PCT Pub. Date: Aug. 31, 2017

(65) Prior Publication Data
US 2019/0156603 A1    May 23, 2019

(30) Foreign Application Priority Data
Feb. 26, 2016   (DE) .................. 10 2016 103 471

(51) Int. Cl.
*B60R 16/023*     (2006.01)
*G07C 9/00*       (2020.01)
(Continued)

(52) U.S. Cl.
CPC ........ *G07C 9/00309* (2013.01); *B60R 16/023* (2013.01); *B60R 25/24* (2013.01);
(Continued)

(58) Field of Classification Search
CPC .................................................. B60R 2325/101
See application file for complete search history.

(56) References Cited

U.S. PATENT DOCUMENTS

| 8,838,325 | B2* | 9/2014 | Tomik | B60K 28/04 340/438 |
| 2010/0207820 | A1* | 8/2010 | Kawano | G01S 11/02 342/393 |
| 2012/0268141 | A1* | 10/2012 | Gierlich | G01S 11/02 324/617 |

FOREIGN PATENT DOCUMENTS

EP    1 650 581    *    4/2006    ............. B60R 25/24

* cited by examiner

*Primary Examiner* — Joseph H Feild
*Assistant Examiner* — Pameshanand Mahase

(57) ABSTRACT

The invention relates to a method (100) for activating at least one security function of a security system (200) of a vehicle (1).
According to the invention, provision is made for the detection of at least one distance information about a distance (A) of a mobile identification transmitter (300) to the vehicle (1) by means of a detection device (10) of the vehicle (1) and a transmission of the distance information by a data transmission from the detection device (10) via a transmission system (50) of the vehicle (1) to a processing device (60) of the vehicle (1), wherein the data transmission of the distance information is performed in a forgery-proof manner.

25 Claims, 7 Drawing Sheets

(51) Int. Cl.
*B60R 25/24* (2013.01)
*G01S 13/02* (2006.01)
(52) U.S. Cl.
CPC ........ *B60R 25/241* (2013.01); *G01S 13/0209* (2013.01); *B60R 2325/101* (2013.01); *B60R 2325/108* (2013.01); *G07C 2009/00555* (2013.01); *G07C 2209/63* (2013.01)

METHOD FOR ACTIVATING OF AT LEAST ONE SECURITY FUNCTION OF A SECURITY SYSTEM OF A VEHICLE

RELATED APPLICATIONS

This application is a National Phase of PCT Patent Application No. PCT/EP2017/053555 having International filing date of Feb. 16, 2017, which claims the benefit of priority of German Patent Application No. 10 2016 103 471.1 filed on Feb. 26, 2016. The contents of the above applications are all incorporated by reference as if fully set forth herein in their entirety.

FIELD AND BACKGROUND OF THE INVENTION

The present invention relates to an activation of at least one security function of a security system of a vehicle according to the preamble of claim 1. Furthermore, the invention relates to a mobile identification transmitter according to the preamble of claim 15 as well as to a security system according to the independent device claim.

Mobile identification transmitters (ID transponders) are used as electronic keys in order to enable the unlocking of a security system of a vehicle as an alternative to mechanical keys. Furthermore, ID transponders can be used for numerous further tasks in vehicles to increase user comfort and security. Infrared systems or radio systems in the low frequency (LF) range are usually employed for the communication of the ID transponder with the vehicle (e.g. with the security system of the vehicle). Authentication data can thereby be transmitted in a contactless (wireless) manner, and thereby the access data can, e.g. be verified, in order to enable an unlocking in the event of a positive authentication.

The authentication can be initiated, for example, by a user of the vehicle by pushing a button. Through such an actuation of the identification transmitter by the user, the signal with the authentication information, e.g. the access data such as a code, is sent to a vehicle-side electronics of the security system. Such systems are also referred to as Active Keyless-Entry systems (if for example a button must be pushed actively). Besides Active Keyless-Entry systems, security systems having the so-called Passive Keyless-Entry or Keyless-Go functions are used increasingly. In contrast to the conventional remote control, an active actuation of the ID transponder (i.e. without pushing a button) by the user is not required in the Passive Keyless Entry functionality. For example, if a user approaches the vehicle, or actuates a door handle, a wake-up signal can be transmitted to the identification transmitter from the vehicle via a radio connection, in particular a Low Frequency (LF) radio connection. The ID transponder will be woken up thereupon, and sends a signal with the authentication code to the security system of the vehicle.

It turned out to be a disadvantage that in such systems, in particular in Keyless-Go systems, elaborate security mechanisms are to be implemented to protect the vehicle, in particular the security systems, against manipulation and theft. For example, measures must be taken in order to avoid the unauthorized activation of a security function of the vehicle, e.g. the unlocking and/or the engine start of the vehicle, via a so-called "Relay station attack". This requires complex and costly measures, which allow, for example, a determination of an actual distance between the OD transmitter and the vehicle. However, a detection and evaluation of such distance information is often too unprecise and/or unreliable.

SUMMARY OF THE INVENTION

Thus, it is an object of the present invention to at least partially remove the above-mentioned disadvantages. In particular, it is an object of the present invention to enable a more cost-efficient, safe and/or reliable activation of security functions of a vehicle. In particular, the preciseness and/or security in the distance determination and/or evaluation of the distance information is to be increased.

The above object is achieved by means of a method having the features of claim 1, a mobile identification transmitter having the features of claim 15 as well as by means of a security system having the features of claim 18. Further features and details of the invention result from the respective dependent claims, the description and the drawings. Here, features and details described in conjunction with the method according to the invention naturally also apply in conjunction with the mobile identification transmitter according to the invention as well as the security system according to the invention, and vice versa, so that reference is or can always be made mutually to the individual aspects of the invention in regard to the disclosure.

This object is particularly achieved by means of a method for a preferably keyless and/or Passive Keyless-Entry and/or Keyless-Go activation of a at least one security function of a preferably keyless and/or Passive Keyless-Entry and/or Keyless-Go security system of a vehicle, wherein at least one of the following steps is provided, which are preferably performed successively or in any order:
a) detecting at least one distance information about a distance of a mobile identification transmitter to the vehicle by means of a detection device of the vehicle,
b) transmitting the distance information to a preferably central processing device, e.g. a central vehicle electronics, of the vehicle through a data transmission from the detection device via a (in particular only one single) transmission system of the vehicle. Preferably, the data transmission occurs directly, i.e. in particular without a change of the transmission type.

Here, it is particularly provided that the data transmission of the distance information occurs in a forgery-proof and/or readout-proof manner. Thus, increased security can be ensured in operation of the security system. Preferably, the transmitted distance information is used and/or evaluated for a distance determination, in particular by the vehicle and/or the processing device, e.g. in order to determine the distance and thus the location of the ID transponder, wherein, in particular, the security function of the security system is activated depending on the localization and/or evaluation.

Preferably, the activation of the security function occurs dependent on a security information, which is determined, for example, dependent on the distance information. For example, the security information includes an information whether the ID transponder is located within the security zone around the vehicle and/or a maximum distance between the vehicle and the ID transponder is not exceeded. Preferably, activation of the security function is effected only in the event that the ID transponder is located within this security zone and/or other conditions are met, such as the positive verification of an authentication code or such-like, which can also be transmittable in an encrypted manner. Here, the security zone extends around the vehicle, in particular with a certain maximum radius (starting from the vehicle). This enables improving security in authentication, in particular when using a keyless activation. The keyless activation particularly relates to the fact that the vehicle can be unlocked without actively using an ID transponder (e.g. the car key) and/or can be started by the very actuation of the start button. Such a keyless activation is, for example, comprised by the so-called Passive Entry/Passive Start (PE/PS) functionality.

Preferably, the detection device and/or the transmission system are provided on the side of the vehicle, i.e. in or at the vehicle. The mobile ID transponder is usually not fixedly arranged in or on the vehicle, unless it has been plugged into a lock or a corresponding receptacle by its user. Apart from that, the mobile ID transponder can be taken away from the vehicle and is not tied to a certain location.

Particularly preferably, the detection device includes at least one communication device, which is, for example, a radio communication device for radio communication. Correspondingly, it can be provided that the detection device serves, in a direct manner, for the detection of the distance information and/or for the distance determination. Thus, in particular, the detection device is the (e.g. temporally) first participant in communication, in which the data for distance determination and/or the distance information are transmitted internally in the vehicle and/or in a wired manner, i.e. no longer via radio. Particularly preferably, the detection device includes an interface for the transition from radio communication to wired and/or in-vehicle communication. Thus, the detection device can e.g. comprise a communication part such as an antenna, which is a physical transition between the radio transmission (i.e. likewise cableless or wire-less transmission) and the cable-bound transmission (i.e. also cable or wired transmission). Prior to the detection of the distance information by the detection device, the forgery and/or manipulation is complicated and/or prevented by the type of communication (such a radio) and/or by a further radio signal encryption. In contrast, in particular the data transmission (after the detection of the distance information) from the detection device via the transmission system to the processing device has a higher transmission type-specific security risk, in particular with respect to the forgery and/or manipulation of the transmitted distance information. In other words, the type of data transmission (e.g. the wired transmission in-vehicle within the vehicle) is more prone to manipulation in regard to a manipulation and/or forgery. This higher risk is counteracted by the forgery-proof and/or manipulation-proof implementation of the data transmission of the distance information, whereby increased security can be ensured in the distance determination and/or activation of the security function.

Furthermore, it is optionally possible in the scope of the invention that the following steps are performed after step b), preferably successively or in any order:
c) evaluating the distance information by the processing device, whereby a localization of the identification transmitter relative to at least one security zone of the vehicle is effected depending on the distance information,
d) Determining a security information for the security system depending on the localization,
wherein the data transmission of the distance information is carried out in such a forgery-proof manner that the distance information for the localization is protected against unauthorized manipulation. To that end, data transmission of the distance information is effected in an encrypted manner, for example, wherein in particular the distance information is encoded by means of an encryption method such as RSA.

Particularly preferably, an encoding of the distance information is effected in such a way that exclusively the processing device of the vehicle includes the (key) information required for decoding. The in particular in-vehicle data transmission of the distance information can be effected e.g. completely and/or basically forgery-proof and/or encrypted, preferably using a different type of encryption than with the radio communication. This allows for a significant reduction of the security risk in in-vehicle communication.

Preferably, it is provided that a (e.g. first and/or second) communication between the identification transmitter and the vehicle takes place, in particular via a radio connection, preferably by means of a wideband communication method, e.g. ultra-wideband. The radio signals transmittable and/or transmitted via the communication or radio connection include e.g. at least one of the following signals:
a wake-up signal,
an authentication signal,
data of a data transmission,
distance information,
comfort information (e.g. for the control of a vehicle lighting system),
user information about the user of the vehicle and/or user-specific vehicle (pre)settings,
navigation information,
GPS information (Global Positioning System),
encryption information (e.g. an encryption code),
signals for distance determination, in particular a request information and/or a reply information.

These signals, which can also be encrypted, are transmitted by means of ultra-wideband technology (UWB), and are thus formed in particular as UWB signals.

Preferably, for communication (e.g. for the initiation), a first signal transmission occurs via a first communication, and subsequently (e.g. as a reply) a second signal transmission occurs via a second communication, wherein the radio frequencies and/or the communication type of the first communication and the second communication are different. Furthermore, it can be provided that the communication enables a localization (e.g. of the ID transponder). Thus, the communication, in particular according to the UWB technology, enables an encrypted and/or highly-precise and/or readout-proof localization of for example the ID transponder. The localization is preferably based on a "time-of-flight" measurement, in particular under "line-of-sight" conditions, wherein the speed of light and/or the communication speed of the communication is considered for the localization and/or evaluation. Particularly preferably, localization is effected with a resolution and/or preciseness in the range of 1 cm to 100 cm, preferably 10 cm to 50 cm, particularly preferably 5 cm to 15 cm. The "line-of-sight" conditions particularly means that the transmission of the radio signals (for example only or exclusively) takes place with and/or in direct visual contact between transmitter and/or receiver. For example, security can be increased in that the (first and/or second) communication takes place only under "line-of-sight" conditions.

Transmitter and/or receiver of the (first and/or second) communication are preferably a communication device and/or detection device of the vehicle as well as a transceiver of the ID transponder. The detection device is preferably a distance measuring device of the vehicle, i.e. a device that (directly) allows the determination of the distance (e.g. between ID transponder and vehicle) and/or the reception of the distance information. In particular, the communication device and/or detection device is connectable to a processing device electrically and/or via radio, wherein e.g. further steps for distance determination and/or evaluation of the distance determination or distance information take place via the connection and/or the processing device. The communication device and/or an encryption unit and/or the detection device and/or the processing device and/or the ID transponder preferably includes one or multiple electronics components, e.g. at least one integrated circuit and/or a random number generator and/or a microprocessor and/or an ASIC (application specific integrated circuit) and/or a digital signal processor (DSP) and/or a correlation receiver and/or the like, in order to for example, evaluate and/or generate the distance information by means of arithmetic information. The random number generator unit includes e.g. a physical and/or deterministic random number generator, preferably at least 10 bit or at least 100 bit or at least 500 bit seed (initial value) entropy, in order to enable an especially reliable encryption.

Preferably, the vehicle is configured as a motor vehicle or passenger car, or as a truck or as an electric vehicle or as a hybrid vehicle. The security system preferably includes an access system and/or a central locking mechanism and/or a locking device and/or a closing system of the vehicle and/or is electrically connected to the electrically-controllable door locks and/or closing elements for example for automatically opening the trunk lid or for locking the doors of the vehicle. Preferably, the vehicle comprises a control unit, which is connected to the onboard electronics. The control unit can perform the authentication process or the authentication request with the ID transponder. Here, the control unit can be directly arranged in the locking device, or in another relevant place of the vehicle. In particular, provision is made for that in the case the authentication be negative, no change of the state of the locking device is effected. This effectively prevents that unauthorized persons bring the locking device into the unlocked state. Advantageously, the access control system is connected to a closing system, which can, inter alia, lock and unlock the vehicle doors, rear trunk lid, and the like. Upon a positive authentication, the vehicle door and/or the trunk lid are unlocked, so that the user (operator) can actively open the door, trunk lid.

Furthermore, it is conceivable that the localization and/or distance information can be evaluated by a further external device. In particular, it can be provided that the ID transponder and/or the vehicle includes an interface, which can be connected to the external device electrically and/or via radio, wherein a (data) transmission, in particular of the distance information or an information dependent thereupon, occurs in particular via the interface. Preferably, the transmitted (distance) information is used to display or output information to a user of the external device based thereupon, which information enables finding the ID transponder.

Preferably, the first and/or second communication is carried out by means of the ultra-wideband (UWB) technology. Communication by means of UWB is based in particular on the technical thinking through that the channel capacity increases linearly with the bandwidth of the transmitted signaler and logarithmically with its power. For example, in communication technologies such as Bluetooth, the available bandwidth is narrow and constant. By contrast, UWB uses a very wide frequency range, in order to enable high channel capacity at reduced transmission power. This provides the advantage that a data transmission can be effected at a very low power consumption through the (UWB) transmitter. The maximum power output of an UWB transmitter, such as the (first and/or second) communication unit, is 1 mW, for example.

In particular, a multiplexing method, preferably a frequency multiplexing method such as an Orthogonal Frequency Division Multiplexing (OFDM) and/or a code multiplexing method such as a Code Division Multiple Access method, in particular a Direct-Sequence-Code Division Multiple Access (DS-CDMA) is employed for communication, e.g. for the first and/or second communication, in particular for the data transmission. Preferably, pulse-type signals are wirelessly transmitted for the transmission of signals and/or data. Here, a shifting of the pulses by means of (pseudo)random values is effected, wherein then (UWB) transmitters and (UWB) receivers consider the same values for the shift. Preferably, prior to or at the start of the transmission of signals and/or data, a temporal synchronization of (UWB) transmitter and (UWB) receiver is effected. Transmitter and/or receiver, in particular UWB transmitter and/or UWB receivers can be and/or include, for example, a (first and/or second) communication unit and/or the associated communication interfaces and/or a communication device (of the vehicle) and/or a transceiver and/or a (first and/or second) transceiver (of the ID transponder). For the evaluation of the received signal, the (UWB) transmitter and/or the (UWB) receiver includes e.g. electronic components such as comparators for the comparison of received pulses and/or correlation receivers and/or integrated circuits and/or microprocessors and/or electronic components for performing a Fast Fourier Transformation.

The transmission of a distance information and/or the communication of the ID transponder with the vehicle and/or the security system of the vehicle, in particular the data transmission of security-relevant data, and/or the distance determination, in particular by means of UWB, preferably occurs in an encrypted manner. To that end, cryptographic security mechanisms such as RSA are employed, which, for example, include connection keys and/or authentication mechanisms and/or the use of secret (private) and public keys and/or a symmetric and/or asymmetric cryptographic system and/or a hybrid encryption. Thus, the advantage that a secure and reliable transmission is possible, is achieved.

The communication via the wideband communication method, preferably via UWB, and/or by means of the wideband communications signal, is preferably effected via at least one large frequency range, preferably with a (total) bandwidth of (at least) 500 MHz to 900 MHz and/or (at least) 3.5 GHz to 10 GHz and/or at least 5 GHz and/or at least 2 GHz and/or at least 1 GHz and/or at least 500 MHz and/or at least 40% and/or at least 30% and/or at least 20% and/or at least 10% of the arithmetic mean value of the lower and upper limit frequency of the user frequency band. The total bandwidth can be composed of the bandwidth of the individual frequency bands, which are commonly used for communication, or related to the bandwidth of one single frequency band used for communication. For example, the frequency range in the range from 0 to 40 GHz, in particular 500 MHz to 900 MHz, preferably 3.5 GHz to 10 GHz, preferably 3.5 GHz to 6.8 GHz, preferably 20 MHz to 11 GHz, particularly preferably 30 MHz to 10.6 GHz, and/or 22.0 GHz to 26.7 GHz and/or 1 MHz to 12.4 GHz and/or essentially 700 MHz can be used. Furthermore, it can be provided that the maximum mean value of the spectral power density for the (UWB) communication is in the range between −90.0 dBm/MHz and −20.0 dBm/MHz, preferably maximally −41.3 dBm/MHz. The data transmission rate for the data transmission is preferably at least 1 Mbit/s or at least 4 Mbit/s or at least 6 Mbit/s, in particular no more than 6.8 Mbit/s or 10 Mbit/s. Thus, a quick and interference-proof transmission is possible.

Preferably, pulses are sent for the (in particular UWB) communication. The distance between the pulses can expediently be greater than the pulse length by magnitudes. It is conceivable here that a pulse width modulation technique and/or a pulse phase modulation technique are used for the data transmission. This ensures a quick, reliable and/or secure data communication.

It can further be provided that according to the UWB communication, also the distance determination is effected by means of a distance measurement such as a signal transit time analysis of a (UWB) radio signal. In particular, a frequency range from 22.0 GHz to 26.6 GHz can be used here. The mean frequency can e.g. be in the frequency range from approx. 1 GHz to 15 GHz, and a frequency bandwidth of at least 500 MHz can be provided.

Furthermore, it can be possible in the scope of the invention that the transceiver of the ID transponder receives a signal from the vehicle (e.g. from an onboard security system and/or the communication device) via a radio connection, and preferably is or can be connected to a processing unit such that the signal received via the radio connection by the transceiver, in particular a wake-up signal and/or an information for distance determination, can be evaluated by the processing unit. It is conceivable here that the radio connection is a first radio connection of a first communication (such as a UWB radio connection) of a first transceiver and/or a second radio connection of a second communication (such as a LF and/or HF radio connection) of a second transceiver unit if the transceiver. In particular, the transceiver and/or the processing unit can be woken up because of the reception of the signal. In this case, waking-up particularly relates to the activation of functions and/or components of the ID transponder or also the change from the sleep mode to the operating mode, e.g. with a higher energy consumption. The (wake-up) signal can, in particular, trigger communication of the ID transponder with the security system.

In particular, the (vehicle-sided) security system can comprise an access system (e.g. central locking mechanism for the vehicle doors), which has Active-Keyless-Entry, Passive Keyless Entry or Keyless Go functionality. The security system serves for example for the keyless activation of at least one security function, in particular an access system of the vehicle, in particular motor vehicle. To that end, in particular an authentication process and/or a distance determination (with positive result) initiated by the (wake-up) signal or following the reception of the (wake-up) signal is required for activation. The positive result relates, for example, to a successful code verification and/or code conformance in the authentication and/or a distance of the ID transponder to the vehicle determined by the distance determination, which must be less than a maximum distance. The authentication process allows activating functions, in particular security functions, of the security system of the vehicle, e.g. an opening or closing of a closing device of the vehicle, e.g. also doors and lids in the rear and/or side region of the vehicle, a starting of the engine/motor or an activation or deactivation of the immobilizer system.

The (wake-up) signal is sent, for example, by at least one onboard communication device and/or detection device of the security system. To that end, e.g. communication parts, in particular antennas, can be provided in different areas of the vehicle, e.g. outside the vehicle, in the interior space, at the doors, in particular door handles, on the roof, the rear side, and/or the side region of the vehicle, or in the trunk. In the event that the (wake-up) signal is transmitted via a UWB and/or LF radio frequency, the range is strongly limited and is also strongly attenuated by the vehicle body and/or (completely) shielded-off. This e.g. also allows a distance determination. This also allows that a device receiving the (wake-up) signal, (e.g. an ID transponder), can be localized inside or outside the vehicle, and preferably the localization inside the vehicle can be discriminated from the localization outside the vehicle. As a support, it is also possible that another method for distance determination is used, such as an evaluation of the signal strength or signal transit time (time-of-flight). After the localization and/or the reception of the signals and/or the distance determination (in a positive result), e.g. an authentication process is initiated, which particularly includes the sending of a reply signal to the security system, wherein the reply signal can contain a code (access code) for identification verification. The reply signal is received and evaluated e.g. by the onboard communication device or by another onboard electronics. Preferably, a UWB and/or LF antenna which is capable of receiving the (wake-up) signal from the vehicle is provided in the ID transponder, in particular in the transceiver of the ID transponder and/or the (first and/or second) transceiver. An antenna of the ID transponder, e.g. a UWB and/or LF antenna, can be provided for the reception, and a separate or the same antenna can be provided for the transmission of signals.

Furthermore, preferably communication parts can be provided, which include in each case one or multiple antennas, in particular UVB antennas. It is conceivable here that for the (in particular UWB) communication, a MIMO method is provided, so that multiple sending and/or receiving antennas are used. For example, a signal processing for the signals received by the antennas is provided. Preferably, the communications parts are arranged on the vehicle in such a way that the implementation of a MIMO method is enabled.

It is also conceivable that the communication part, in particular the respective antenna, is formed in such a way that the type of construction and/or the antenna parameters and/or the antenna construction and/or the length and/or the extension of the antenna is adapted to the UWB method and/or the (in particular UWB) bandwidth used for the communication. Thus, it is possible that at least one of the respective antennas is configured as a linear antenna and/or as a flat-top antenna and/or as an antenna array. In particular, the length of the antenna is adapted to the center frequency and/or pulse length used for communication. The antenna construction can be, in particular, a UWB-specific construction type, e.g. a Rugby-Ball antenna, or in a Tapered Slot construction type.

Preferably, the communication part, in particular the antenna, can comprise a planar metal structure and/or at least one waveguide. Furthermore, it is conceivable that the communication part/the antenna is configured in such a way that a sending and/or receiving of high frequency (HF) signals can be performed. The antenna can be formed as an omnidirectional antenna, for example. Likewise, the communication part or the antenna can have a directivity and include, to that end, at least one dipole element, in particular a three-dimensional dipole element.

Further preferably, a data transmission can be effected in such a way that a UWB specific modulation type is used. Such type of modulation is, for example, a pulse width modulation and/or a pulse phase modulation. Furthermore, it is conceivable that the information of the data transmission is modulated onto a communication signal by means of an encoding of the polarity and/or the amplitude and/or the direction of pulses (sent by the communication). To that end, orthogonal pulses can be used, for example.

It is optionally also conceivable that the data transmission of the distance information from the detection device via the transmission system to the processing device is at least partially effected in such an encrypted manner that a decryption for the evaluation of the at least partially encrypted distance information, in particular completely encrypted distance information, transmitted preferably via the data transmission, can be effected by the processing device only based on a key information, wherein preferably the key information is evaluated by the processing device and/or a decryption device. For example, here, the key information is stored, in particular digitally, readable for the processing device, in a non-volatile data storage unit (of the vehicle). It can be provided that the data transmission, i.e. the transmission of the distance information and/or further information and/or data, is effected completely encrypted or only partially encrypted, e.g. only by the encryption of the distance information. Preferably, it can be possible that only the security-relevant data of the data transmission are transmitted in an encrypted manner. It can also be possible that the data (e.g. the distance information) of the data transmission are at least partially encrypted already by the ID transponder and/or are transmitted in an encrypted manner to the detection device. This particularly depends on whether the distance information is determined and/or generated in the detection device (detection device performs encryption) or is already determined and/or generated in the ID transponder (ID transponder performs encryption). Thus, it can be possible that the distance information is determined by the ID transponder and, subsequently, is transmitted to the detection device (e.g. encrypted). In this case, the detection device can decrypt the distance information, for example, and/or verify it and/or re-encrypt it for the data transmission to the processing device (e.g. with another key information). It is also conceivable that the detection device does not include any key information, and thus only forwards the encrypted signal (e.g. the encrypted distance information) from the ID transponder to the processing device. Alternatively, it is possible that the detection device per se determines the distance information, e.g. based on the signals of the communication with the ID transponder, and correspondingly also encrypts e.g. the distance information. As a matter of fact, likewise a combination of these possibilities is conceivable to further increase the security in operation of the security system.

Preferably, besides an encryption and/or forgery-proof data transmission, a further encoding of the data and/or distance information is effected. Preferably, the term "encryption" of e.g. the data and/or a "forgery-proof" transmission particularly relates to a security function for the prevention of an intentional manipulation of the transmission or data. Hereby, in particular, the terms "encryption" and "forgery-proof" are discriminated from other encoding and/or control and/or error correction methods for the prevention and/or recognition of wrong or faulty transmissions (due to transmission errors such as noise). Preferably, the terms are also discriminated from encodings that are (exclusively) used to enable data transmission (character encoding, multiplexing, spreading code, etc.), in particular if these are only used for the transmission and not for the protection against manipulation. An intentional manipulation here particularly relates to the unauthorized intentional alteration of the data transmission caused by a person.

Furthermore, it is conceivable that a key information for decryption is stored in a non-volatile data storage unit of the vehicle in a readout-proof manner, wherein the non-volatile data storage unit is connected electrically to the processing device and/or a decryption device. The key information can be protected in a readout-proof manner in such a way that, for example, that the non-volatile data storage unit comprises a (mainly) electronic security mechanism, which electronically includes cryptographic methods for the storing and/or encryption of the key information. For example, the non-volatile data storage unit may comprise an integrated circuit, which provides security mechanisms. It is also conceivable that the non-volatile data storage unit is connected to a corresponding security IC (integrated circuit) having such security mechanisms. This allows a manipulation through the read-out of the key information on the vehicle.

Furthermore, it can be provided that in particular temporally prior to step a), at least one of the following steps is provided:
performing a distance determination through a processing unit of the identification transmitter, whereby the distance information is and/or can be determined, in particular with the distance,
transmitting the distance information, in particular with the distance, from the identification transmitter to the detection device of the vehicle, wherein the transmission of the distance information preferably occurs in an encrypted manner.

The transmission can be effected via the communication between the ID transponder and the communication device and/or the detection device, for example. Preferably, the same or a different key information is used here for the encryption of the distance information as the one used for the encryption of the data transmission of the distance information from the detection device to the processing device. Thus, it is conceivable that a first key information is stored in the ID transponder and that a second key information, which is different from the first key information, in stored in the detection device and/or that a third key information, which is different from the first and/or second key information, is stored in the processed device. Likewise, a combination or configurable switching between two or multiple of the mentioned methods is conceivable, in order to enable, for example, a multifunctional adaption to various security systems.

Furthermore, it can be provided in the scope of the invention that the following step is provided, preferably temporally before step a):
performing a distance determination by the detection device, preferably by a detection evaluation unit of the detection device, whereby the distance information is determined.

In this case, the detection evaluation unit can comprise the same electronic components as have been mentioned, for example, for the processing device and/or an encryption device of the vehicle. In particular, the detection evaluation unit is configured to perform arithmetic operations which serve for the determination of the distance information. In particular, the detection device for the determination of the distance information includes at least one analogue-to-digital converter, in order to digitalize the radio signals received from the identification transmitter and/or in order to be able to electronically further process these signals.

Furthermore, it is conceivable in the scope of the invention that a transmission of the distance information from the identification transmitter to the detection device and/or the processing device of the vehicle occurs in such an encrypted manner that the identification transmitter performs an encryption based on a preferably public first key information, and the detection device and/or the processing device performs the decryption based on a preferably secret second key information, which is different from the first key information. To that end, the detection device and/or the processing device can include for example a decryption device and/or an encryption device, which can comprise such electronic components, for example, as have also been described in relation to the processing device. In particular, it is conceivable that the encryption and/or decryption is effected by means of a symmetric and/or asymmetric encryption. A secret key information preferably means an information relevant to the decryption, e.g. a private key, which must not be known to the public in order to ensure the security of the key information. Preferably, the public key information is an information and/or a public key, which enables an encryption of data in such a way that a decryption of this encrypted data can be performed exclusively by the secret key information. Such public and secret (private) key information are known, for example, from asymmetric cryptographic methods such as RSA, and enable a very high security standard in the transmission of data.

Optionally, it can be provided that the data transmission of step b) is effected in such an encrypted manner that the detection device performs an encryption based on a preferably public first key information, and the processing device performs the decryption based on a preferably secret second key information, which is different from the first key information. Preferably, decryption is only possible with the secret key information, i.e. not by the public key information. Thus, for example a manipulation can be prevented in that a public key information of e.g. the ID transponder is read-out.

It is furthermore conceivable that a digital key information is provided for the encryption of the distance information, and at least has a key length of 10 bit to 10000 bit, preferably 512 bit to 4096 bit, preferably 1024 bit to 2048 bit, wherein particularly preferably, the key information is used as a cryptographic key for the asymmetric or symmetric encryption. This allows a further increase of the security in the transmission of data.

Furthermore, it can be provided that a transmission of the distance information, in particular by the data transmission and/or from the identification transmitter to the detection device and/or to the processing device is effected in such an encrypted manner that a key information is changed in an alternating manner and/or temporally and/or randomly and/or on the basis of a cryptographic algorithm. For example, a so-called rolling code can be used for the alternating change. For example, the ID transponder and/or the detection device and/or the processing device includes a list with various key information, which are different from one another and/or arranged in a predefined order. In this way, a so-called replay attack, which is based upon the recording of communication, can be hindered.

Moreover, it is advantageous if a distance determination is performed by an evaluation of a communication signal for the communication between the identification transmitter and the vehicle, whereby the distance and/or the distance information is determined by the distance determination. For example, it can be possible that the distance information includes the determined distance already (in particular the distance between the vehicle and the ID transponder), or merely information about the distance, i.e. for example information such as signal strength, which are used to determine the distance. Preferably, for the detection of the distance information by the detection device, the distance information is determined based upon a signal transit time analysis of the ID transponder and/or subsequently transmitted to the detection device via the communication and/or a radio signal and/or a further communication. In particular, the distance can be determined by the distance information, wherein the distance information e.g. delivers one out of multiple information required to determine the distance. Thus, it can be ensured that the ID transponder must be situated within the maximum distance to the vehicle in order to activate the security function.

In a further option, it can be provided that a distance determination is carried out by a signal transit time analysis of a communication signal, preferably an ultra-wideband signal, a communication between a communication unit of the vehicle and a transceiver of the identification transmitter, wherein preferably the detection device includes the communication unit. Here, the communication preferably is a radio communication, and the communication signal preferably is a radio signal, in particular for the transmission of data and/or the distance information. Furthermore, the transmitted data can also include authentication data, for example, wherein e.g. the distance information by the detection device is effected by an evaluation of the communication signal. Likewise, a combination of these options is conceivable, in order to increase, for example, the reliability and/or the preciseness of the distance determination. In other words, multiple information can be considered for the determination of the distance and/or the distance information, such as the signal strength and/or the distance information and/or the transmitted data, which are combined for the determination of the distance and/or of the distance information.

A further advantage can be achieved within the scope of the invention if at least one communication between the identification transmitter and the vehicle is effected via at least one communication signal as a wireless communication by at least one of the following communication technologies:

Bluetooth,
Bluetooth Low Energy,
Ultra-wideband.

Preferably, the distance information can be determined by evaluating particularly the signal strength of the communication signal of the communication. Here, the first communication is preferably effected by a first communication unit and the second communication is preferably effected by a second communication unit of the communication device and/or the detection device. Preferably, the communication device and/or the detection device is connected to an energy management device, in order to activate an energy-saving mode of the communication dependent upon the situation. This mode can, for example, include a switching operation so that e.g. the communication via ultra-wideband is turned-off and/or instead another communication type (communication technology) is activated, such as e.g. Bluetooth, Bluetooth Low Energy, LF, HF, or the like.

In particular, in the scope of the invention, Bluetooth also means Bluetooth Low Energy.

Furthermore, it can be provided that a communication field with a security zone is generated by a communication device of the vehicle, in particular by a first and/or second communication unit of the communication device. In particular, a further and/or first and/or second communication with the ID transponder by a further and/or first and/or second communication unit is permitted only in the case that the localization of the ID transponder is determined to be situated within the security zone. In this way, for example, a manipulation of the authentication can be prevented upon reception of authentication data from an ID transponder outside the security zone.

Furthermore, it is conceivable that a first communication unit is configured for Bluetooth and/or Ultra-wideband and/or HF (high frequency) communication and/or a second communication unit is configured for LF (low frequency) or HF communication. A LF communication is effected, for example, for the initiation of the ID transponder, e.g. by a wake-up signal. The radio transmission using LF occurs in a frequency range of approximately 125 kHz, for example. Preferably, the (LF-) security zone (e.g. the radius of the security zone) is defined by the maximum transmission power in the use of the LF communication, since here the maximum possible range (at 125 kHz) is approximately 2 m. Accordingly, the first and/or second security zone (as LF security zone) has a radius of approximately 2 m. Furthermore, the security zone can be defined in a simple manner by the setting of the maximum transmission power and/or reception power (e.g. of the detection device and/or communication device), whereby a significant cost reduction is possible.

It can also be provided that preferably by the in particular limitation of the maximum permissible transmission power, the radius of the first and/or second security zone is in a region from 1 m to 100 m, preferably 1 m to 10 m, preferably in a range from 2 m to 6 m, and/or 4 m to 5 m. Furthermore, it can be provided that the radius of the first and/or second security zone is defined and/or limited in that a visual connection between the communication device and/or detection device and the ID transponder must be present. In addition, it can be possible that the radius of the first security zone is determined by a parametrization, and thus is available as a digitally stored value. In this case, for example by an evaluation of the UWB communication and/or he distance information, the actual distance between the ID transponder and the vehicle can be set and compared to the pre-stored value, in order to determine whether the ID transponder is situated within the security zone or the first security zone. It can also be possible that besides a second security zone is defined, wherein the radius of the second security zone is determined, for example, by the maximum permissible transmission power of the (second) communication.

Furthermore, it can be provided that a first or second communication unit of a communication device of the vehicle and/or a first or second transceiver of a transceiver device of the identification transmitter is activated in the event that it is determined that the identification transmitter enters the in particular first or second security zone. This enables, for example, that a (first or second) transceiver unit for UWB communication is activated only in the event that the entry into the first or second security zone has already been determined, in order to lower the energy consumption, for example. The determination that an entry into the first or second security zone has been effected can be made in that an initiation of the first or second communication is detected and/or that a distance of the identification transmitter is determined to be within the first or second security zone by means of the localization.

Furthermore, it can be provided that a first or second communication unit of the communication device of the vehicle and/or a first or second transceiver unit of a transceiver device of the identification transmitter is deactivated, if it is determined, based on the localization, that the identification transmitter is situated outside of particularly a first or second security zone. As a result, this achieves the advantage that the communication can be turned off, if it is not required, and the energy consumption is lowered, as a result.

Optionally, it can be provided that the data transmission of the distance information is effected via at least two transmission stations of the transmission system, wherein an encryption and/or decryption is effected by each transmission station based on a respective key information. Here, the transmission stations serve, in particular, for the in-vehicle data transmission and/or are formed as bus system users. Accordingly, it can be provided that the data transmission is effected via an in-vehicle (data) bus, in order to enable a reliable and fast communication.

Furthermore, it is conceivable that the localization of the identification transmitter is effected by means of a first communication of a first communication unit, in particular only in the outer space of the vehicle, redundantly and/or in a supporting manner to the localization of the identification transmitter based on a second communication by a second communication unit. The outer space of the vehicle is the outer region of the vehicle and/or the region in which exclusively a radio communication (of the first and/or second communication) is effected. In particular, it can be provided that the first communication is used as an UWB communication only in the outer space of the vehicle and is not used for the localization of the ID transponder inside the vehicle, for example. Outside the vehicle, the first communication can be effected in such a manner to support the second communication that the accuracy of the localization is increased, for example, in particular in that different localization types and communication types are employed for the first and second communication.

Likewise subject-matter of the invention is a mobile identification transmitter (ID transponder) for an activation of at least one security function of a security system of a vehicle and/or for the authentication of a security system of a vehicle and/or for the authentication of a security system of the vehicle, wherein a wireless communication between the identification transmitter and a communication device in the vehicle can be performed. In this case, it is provided that an encryption unit for the encrypted transmission of distance information is provided. Thus, the identification transmitter according to the invention provides the same advantages as have been described in detail with respect to the method according to the invention. In addition, the mobile identification transmitter can be suitable to be operated in accordance with a method according to the invention. It can be provided that the encryption unit includes a decryption unit and/or that a decryption unit of the mobile identification transmitter is provided in addition to the encryption unit. Furthermore, it can also be provided that an encrypted transmission of one or more authentication information (such as codes, for example) to the security system can be carried out.

It can optionally be enabled that a first transceiver unit and a second transceiver unit is provided, wherein in particular the first transceiver unit includes a Bluetooth and/or Bluetooth Low Energy and/or Ultra-Wideband interface, and preferably the second transceiver unit includes a LF and/or HF interface. As a result, a reliable communication with the corresponding communication units of the vehicle is enabled. These communication units are, for example, a first communication unit for Bluetooth and/or Bluetooth Low Energy and/or Ultra-wideband communication and/or a second communication unit for LF and/or HF communication.

Likewise subject-matter of the invention is a security system of a vehicle, comprising:
- at least one detection device of the vehicle for the detection of at least one distance information about a distance of a mobile identification transmitter, in particular a mobile identification transmitter according to the invention, to the vehicle,
- at least one, in particular central, processing device of the vehicle for the evaluation of the distance information, whereby in particular a localization of the identification transmitter dependent upon the distance information can be carried out,
- a transmission system of the vehicle for the transmission of the distance information by a data transmission from the detection device to the, in particular central, processing device.

It is provided here that the data transmission of the distance information can be effected in a forgery-proof and/or readout-proof and/or encrypted manner. Thus, the security system according to the invention provides the same advantages as have been described in detail with respect to the method according to the invention and/or with respect to a mobile identification transmitter according to the invention. Furthermore, the security system can be suitable to be operated in accordance with a method according to the invention.

Furthermore, it is optionally provided that the detection device includes a communication device for the communication with the identification transmitter with at least two communication units on the vehicle. It is also conceivable that further communication units such as e.g. a third and/or a fourth communication unit are provided on the vehicle. Preferably, the communication units enable communication with in each case different types of communication. Thus, a first communication is possible through the first communication unit, and a second communication is possible through the second communication unit, wherein the first communication differs from the second communication with respect to the type of communication. This enables, for example, the increase of safety from interception and/or the increase of reliability.

Advantageously, it can be provided in accordance with the invention that a second communication unit of the vehicle includes a Bluetooth and/or LF and/or HF communication interface, which is at least partially different from the communication interfaces of a first communication unit of the vehicle. In particular, the first communication unit of the vehicle includes at least one of the following communication interfaces: Bluetooth, Bluetooth Low Energy, Ultra-Wideband, or the like. Preferably, communication, in particular the first and/or the second communication is a bidirectional communication between the ID transponder and the vehicle. It is also conceivable that the communication, in particular the first and/or second communication and/or a further communication, is effected between different ID transponders, e.g. for the exchange of data and/or of the exchange of key information, in particular a public key information. This provides the advantage that e.g. a new ID transponder can be programmed to an existing ID transponder. Preferably, the (first and/or second) communication unit serves as a communication interface to the ID transponder, or also as a gateway and/or for the data transmission of vehicle information to the ID transponder and/or for the realization of comfort functions, such as finding the ID transponder via RSSI (Receives Signal Strength Indicator) values of the BTLE Advertising/Connected Telegrams.

According to another advantage, it can be provided that the transmission system includes at least one bus system, preferably a LIN—(Local Interconnect Network) and/or CAN—(Control Area Network) and/or SPI (Serial Peripheral Interface) and/or I2C bus system (Inter-Integrated-Circuit-Bussystem), and preferably an encryption device, or is connected to an encryption device. Preferably, the I2C bus system concerns the communication between a distance-measuring component of the vehicle, such as the detection device and/or a communication part (e.g. of the detection device), and a microcontroller (e.g. of the detection device). In particular, an encryption of the data transmission of the bus system and/or between the distance-measuring component and the processing device is effected. Likewise, it is conceivable that a combination of the mentioned bus systems is employed.

In another option, it can be provided that the detection device includes at least one communication part, in particular an antenna and/or a satellite component, for transmitting and/or receiving electromagnetic waves of a communication signal, wherein particularly preferably, the distance information can be transmitted from each communication part to the processing device via the transmission system in an encrypted manner. Preferably, at least two or at least three or at least four and/or at least five communication parts are arranged on the vehicle, for example partially on the roof of the vehicle. It is conceivable here that the encryption is already effected inside the communication part, or only in a detection evaluation unit of the detection device. Likewise, it can be provided that each of the communication parts comprises in each case one detection evaluation unit, which is used for encryption and/or decryption, for example. Accordingly, it can be provided that each of the communication parts comprises a, for example public, key information, in order to ensure a reliable encryption.

Furthermore, it is conceivable that at least one communication part is arranged on the roof of the vehicle, wherein the communication part is electrically connected to a communication device of the vehicle. Alternatively or additionally, it is conceivable that at least one further communication part is arranged e.g. on the rear side of the vehicle and/or inside the vehicle. Furthermore, it can be possible that a determination of a distance information about the distance of the identification transmitter to the vehicle can be performed by a transceiver unit of the identification transmitter by means of an evaluation of the communication, and the distance information is transmittable to the security system, preferably to at least one communication part. This allows a reliable and secure determination of the distance.

BRIEF DESCRIPTION OF THE SEVERAL VIEWS OF THE DRAWINGS

Further advantages, features and details of the invention result from the following description, in which exemplary embodiments of the invention are described in detail with reference to the drawings. Here, the features mentioned in the claims and in the description can be essential to the invention individually or in any combination. The Figures show in:

The same reference characters are used for the same technical features even in different exemplary embodiments throughout the Figures.

DESCRIPTION OF SPECIFIC EMBODIMENTS OF THE INVENTION

Figure 1:
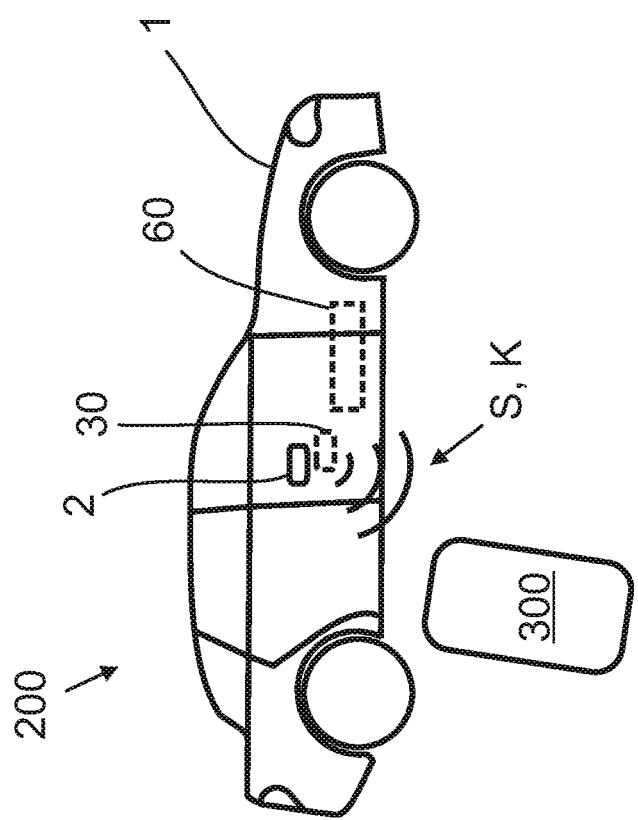
FIG. 1 a schematic side view of a vehicle.

FIG. 1 schematically shows a vehicle 1 in a side view. In this case, the vehicle 1 includes at least parts of a security system 200 according to the invention. Thus, a communication unit 30 as well as a processing device 60 is provided on and/or in the vehicle 1. Optionally, a proximity sensor 2 for the detection of an approach of an operator of the vehicle 1 is arranged in the area of the door handle of the vehicle 1. The communication unit 30 serves for the communication with a mobile identification transmitter 300. To that end, a communication field K is generated by the communication unit 30, wherein information is transmitted wirelessly via radio waves of the communication field K. For the communication with the mobile identification transmitter 300, communication signals S are received and/or sent by the communication unit 30, for example, preferably via the communication field K. In particular, the communication field K (as a UWB communication field K) serves for the transmission of UWB communication signals S, wherein in this case, the communication signal S uses radio waves (of the communication field K) in an especially wide frequency spectrum. Thus, the UWB communication signals S preferably include an especially wide frequency spectrum. Preferably, a frequency range with a bandwidth of at least 500 MHz is used for the communication field K and/or for the communication signal S. Accordingly, the communication signal S can be referred to as a wideband communication signal S.

Figure 2:
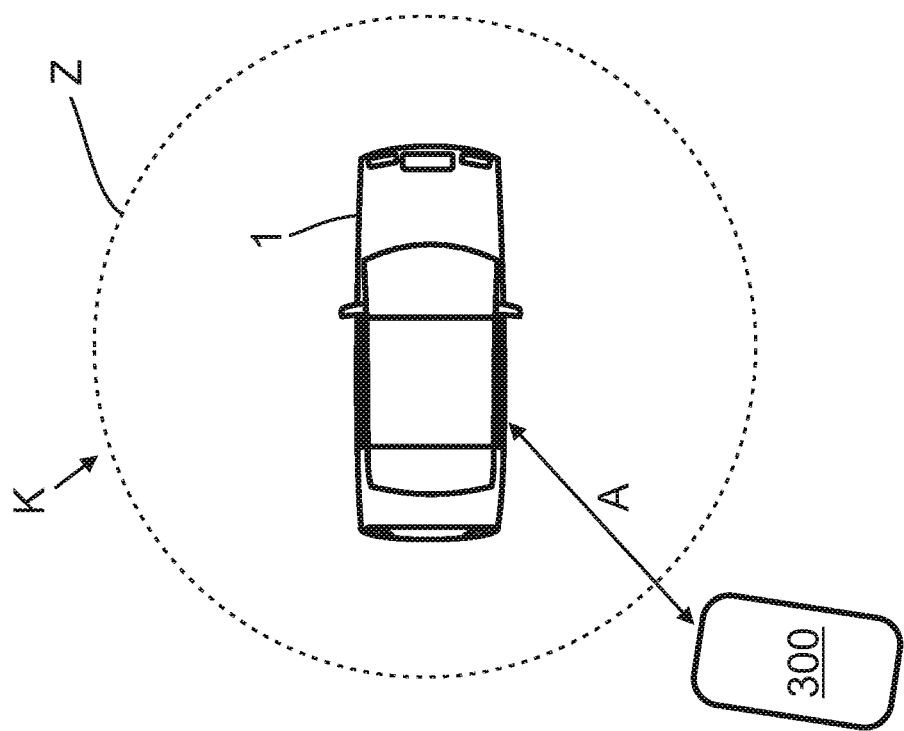
FIGS. 2, 3 and 4 schematic views of a vehicle in a plan view.

At least one security zone Z can be provided around the vehicle, wherein the extension of the security zone Z is particularly defined dependent upon the communication field K and/or a communication of the vehicle 1. This is schematically shown in FIG. 2, wherein the circular shape of the communication field K and/or of the security zone Z merely serves for illustration purposes. In reality, the range and/or extension of the security zone Z can likewise extend in an irregular manner, depending on the surroundings of the vehicle 1.

The security zone Z and/or different security zones Z of the vehicle 1 can be determined or defined in different manners. Thus, the range of communication via the communication signal S is, in particular, determined by the extension of the communication field K. Depending on this physical limitation of the range, the security zone Z can be defined in accordance with a first possibility. In this case, a distance determination can be used in order to perform a determination of a distance A between the identification transmitter 300 and the vehicle 1. When the security zone Z is determined by the maximum reach of the communication field K, it can be assumed for distance determination that the identification transmitter 300 being located outside the security zone Z, e.g. in the event that communication is not existent. In this case, the distance determination is effected based upon the maximum communication range. Alternatively or additionally, it can be provided in accordance with a second possibility that the security zone Z is defined as a maximum distance to the vehicle 1, which is, for example, within the maximum communication range. For the determination of the distance, consequently, the communication is performed actively and received signals are evaluated. To that end, the distance determination must determine distance information about the actual distance A of the identification transmitter 300 to the vehicle 1. This can take place by a signal transit time analysis of the communication signal S, for example. The evaluation of the communication signal S for the distance determination corresponds, in particular, to an evaluation of the communication between the vehicle 1 and the identification transmitter 300 and/or to an evaluation of the communication field K.

The distance determination and/or an evaluation of the distance information obtained thereby by a processing device 60 of the vehicle 1 allows a specific localization of the identification transmitter 300 relative to the security zone Z. The distance determination is initiated, for example, when an approach of the identification transmitter 300 is detected by a proximity sensor 2 of the vehicle 1. Alternatively or additionally, the distance determination can also be initiated as soon as communication of the vehicle 1 with the identification transmitter 300 is possible and/or a connection has been established for communication. Furthermore, the distance determination can also be initiated in that an entry of the identification transmitter 300 into a certain security zone Z is monitored, and the initiation of the distance determination takes place when or after entering the said zone.

Figure 4:
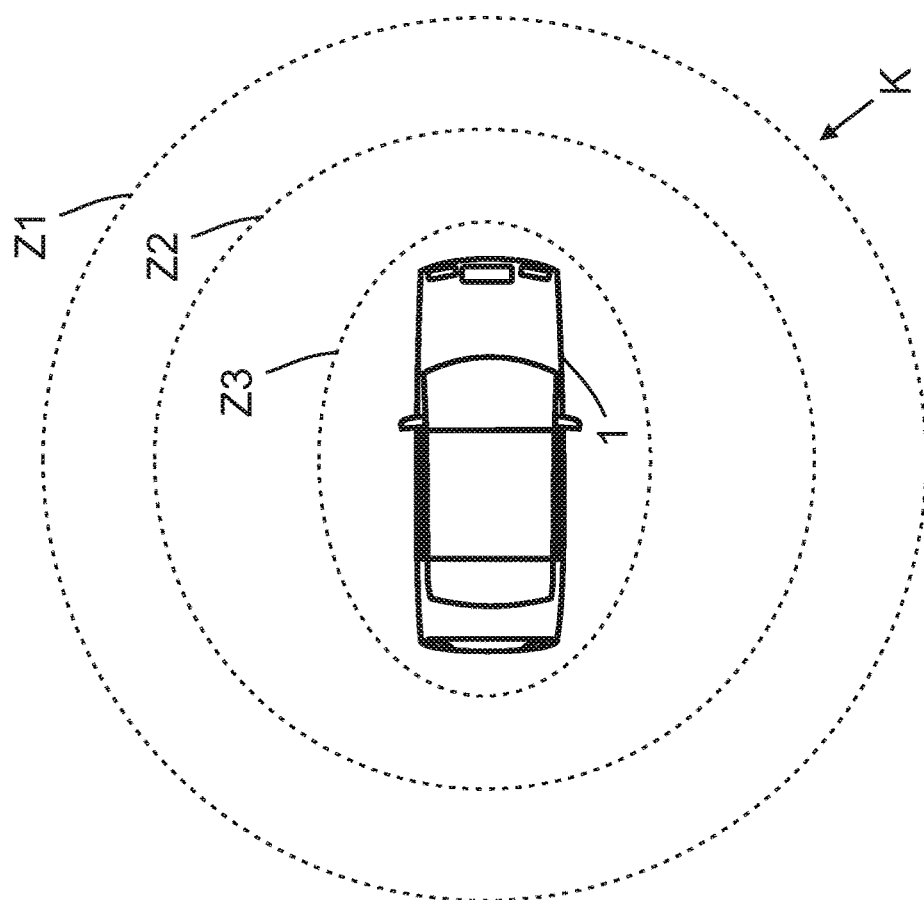
Figure 3:
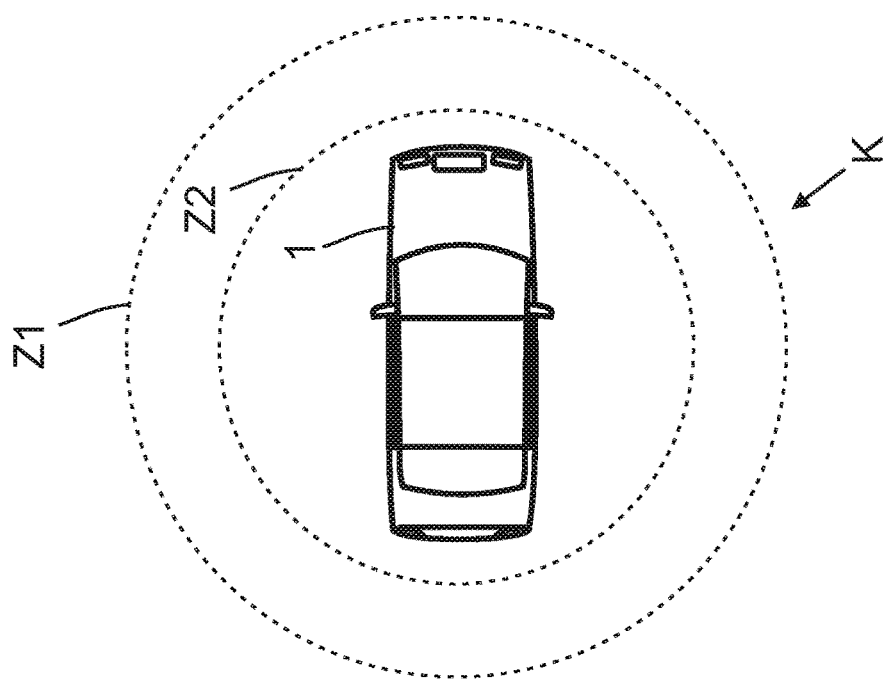

FIGS. 3 and 4 schematically show that likewise multiple security zones Z can be provided. For example, a first security zone Z1 and a second security zone Z2 as well as, as the case may be, a third security zone Z3 and/or further security zones Z can be provided at different distances to the vehicle 1. It is conceivable here that the third security zone Z3 having the smallest distance to the vehicle 1 forms a comfort zone Z3, wherein a localization of the identification transmitter 300 within the comfort zone Z3 (in particular merely) causes the activation of comfort functions. Such a comfort function is, for example, an activation of a front lighting system of the vehicle 1, which is particularly effected when the identification transmitter 300 enters the comfort zone Z3. Another comfort function is, for example the activation of a vehicle lighting system. The first security zone Z1 extends, in particular, at a greater distance from the vehicle 1 than the second security zone Z2. For example, the identification transmitter 300 is localized in the first security zone Z1 when a second communication is initiated by a second communication unit 32, for example a LF communication between the vehicle 1 and the identification transmitter 300. Here and/or dependent upon a further localization, for example the second communication, and/or in a successful pre-identification of the security system 200 with the identification transmitter 300, a first communication with a first communication unit 31 with the identification transmitter 300, preferably via ultra-wideband, can be initiated. Based upon this first communication, a distance determination can be re-conducted, for example through an evaluation of the communication signal S of the first communication, i.e. of a first communication signal S1. This renewed distance determination can preferably be repeated in a cyclic manner. If, now, a distance A of the identification transmitter 300 from the vehicle 1 is determined, by this renewed distance determination, to be equal to and/or smaller than the distance of the second security zone Z2 from the vehicle 1, a localization of the identification transmitter 300 within the second security zone Z2 is effected. Upon a successful localization of the identification transmitter 300 within the second security zone Z2, an authentication process can be initiated, for example. Now, a renewed distance determination can in turn be made. If, by this distance determination, a distance A of the identification transmitter 300 from the vehicle 1 is determined to be equal to and/or smaller than the distance of the third security zone Z3 from the vehicle 1, a localization of the identification transmitter 300 within the third security zone Z3 is effected. Upon a successful localization of the identification transmitter 300 within the third security zone Z3, a renewed authentication process can be performed and/or a comfort function can be activated and/or an access system of the vehicle 1 can be activated and/or a door and/or a lock of the vehicle 1 can be opened.

Figure 7:
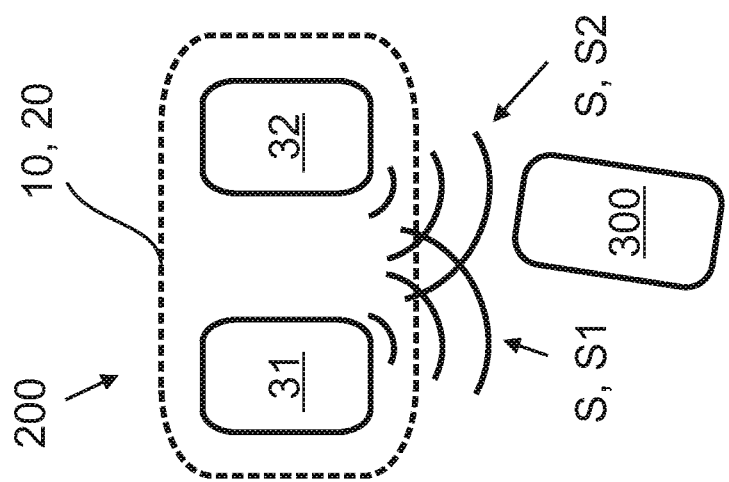
FIGS. 5, 6 and 7 further schematic representations of a security system according to the invention, FIG. 8+9 further schematic representations of a security system according to the invention, FIG. 10 a further schematic representation of parts of a security system according to the invention, FIG. 11 a schematic plan view of a vehicle having a security system according to the invention, and FIG. 12 a schematic representation for visualizing a method according to the invention.
Figure 6:
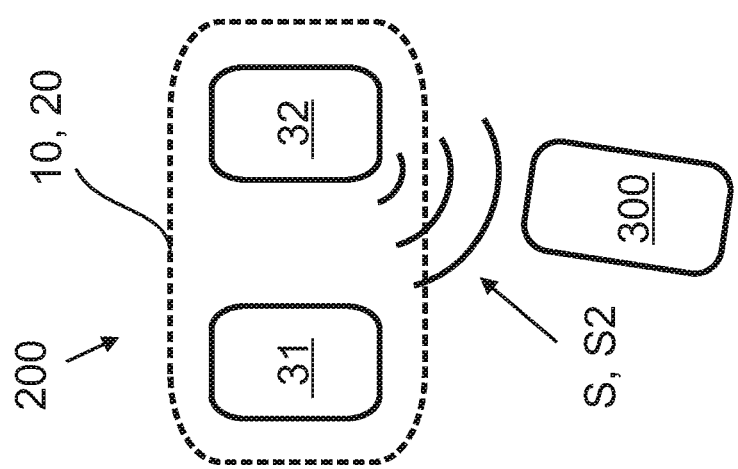
Figure 5:
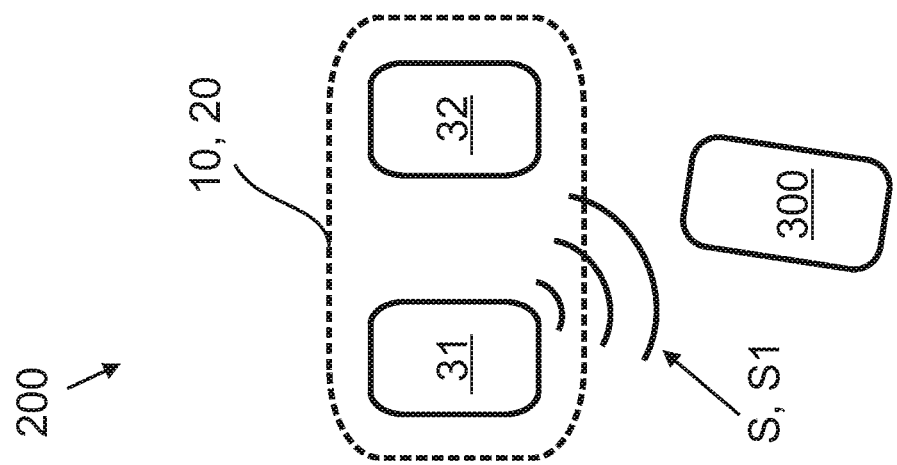

FIGS. 5 to 7 show this process in a more detailed manner, in particular the first and second communication. The security system 200 includes at least one detection device 10 and/or at least one communication device 20 for performing communication. Here, the communication device 20 can, for example, be at least part of the detection device 10 of the vehicle 1. Thus, the communication device 20 and/or the detection device 10 can be electrically connected to one another, for example, and/or be formed as a (common), in particular electric, component. It is also conceivable that the communication device 20 receives the signals of communication, evaluates them, as the case may be, and particularly performs a distance determination and/or detects the distance information. Thus, the communication device 20 can also form the detection device 10 (or correspond to it), and/or vice versa. The communication device 20 and/or the detection device 10 includes at least one communication unit 30, preferably a first communication unit 31 and a second communication unit 32. The first communication unit 31 serves for a first communication with the identification transmitter 300 and the second communication unit 32 serves for a second communication with the identification transmitter 300.

A first communication signal S1 is used for the first communication, and a second communication signal S2 is used for the second communication. According to FIG. 5, the first communication takes place, for example, via the first communication signal S1 for the distance determination. According to FIG. 6, the second communication can be used via the second communication signal S2, in order to transmit, for example, a wake-up signal to the identification transmitter 300, and/or also perform a distance determination. Just as well, the emission of the wake-up signal and the subsequent monitoring for a reply signal can be considered to be a distance determination (in regard to the maximum communication range, which is used as an indicator for the entry into a security zone Z and/or for the required distance A). According to FIG. 7, a first and second communication is used simultaneously. In this way, for example via the second communication, i.e. via the second communication signal S2, the distance determination can be performed, wherein the result of the distance determination (i.e. the distance information) is verified based on a further distance determination by the first communication with the first communication signal S1. It is also conceivable that an authentication is performed via the first and/or second communication. Furthermore, it can be provided that the first communication is only used in the event that the second communication is faulty, for example.

Figure 8:
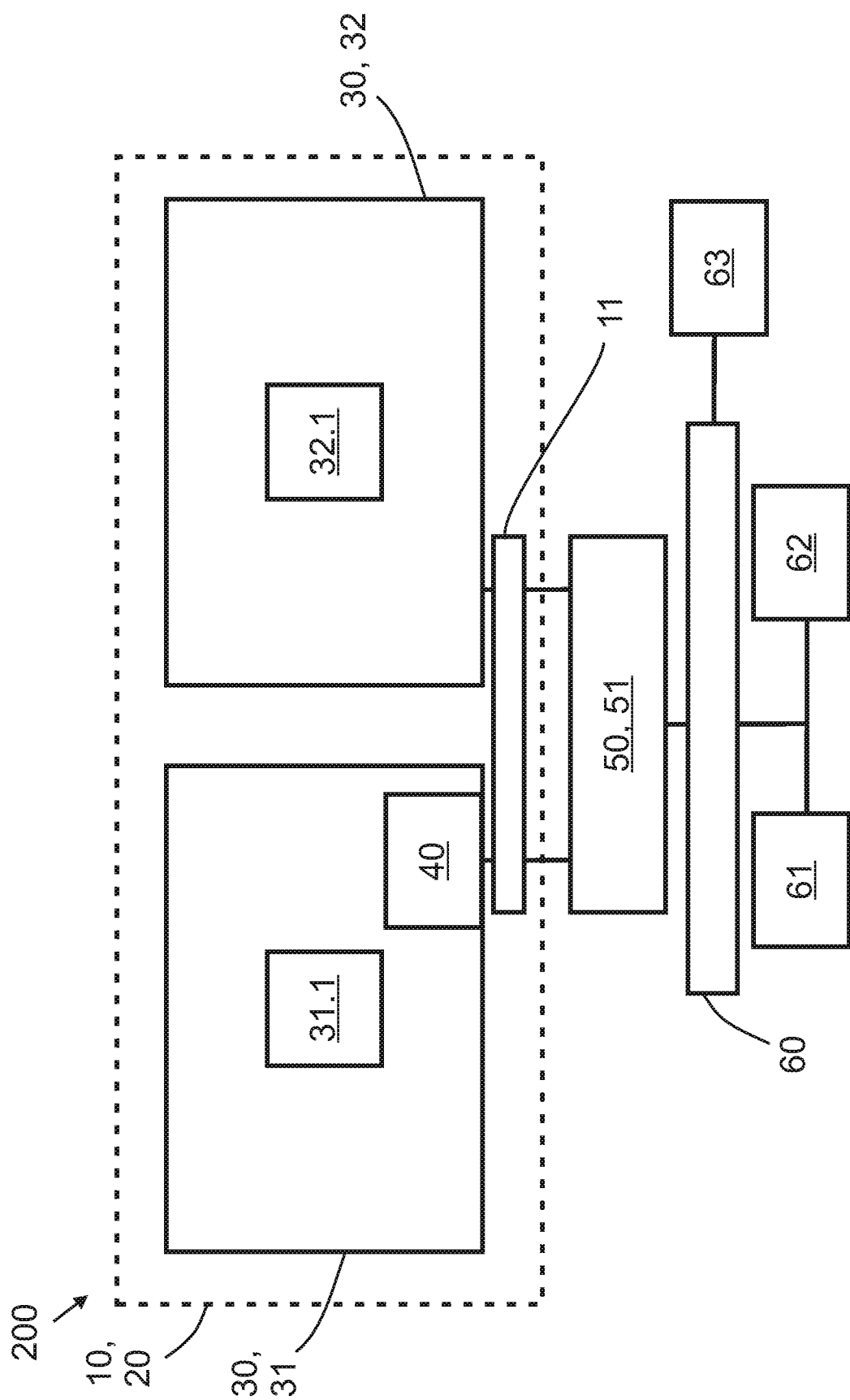
Figure 9:
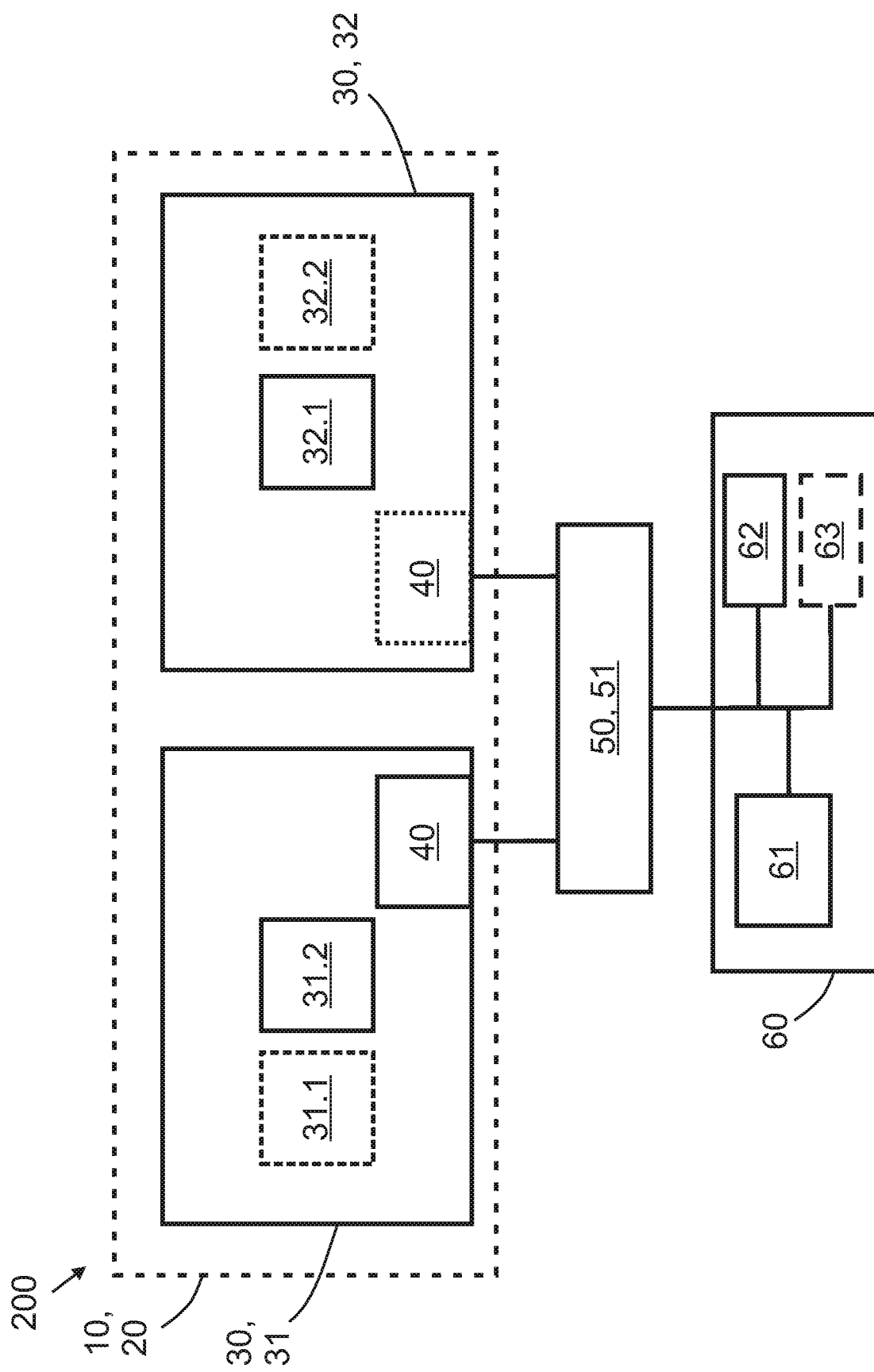

FIG. 8 shows a schematic construction of a detection device 10 and/or a communication device 20 of a security system 200 according to the invention. Here, the detection device 10 and/or the communication device 20 includes at least one communication unit 30, in particular a first communication unit 31 and a second communication unit 32. The first communication unit 31 includes at least one first communication interface 31.1, in particular an ultra-wideband interface and/or a Bluetooth interface. The second communication unit 32 includes at least one second communication interface 32.1, preferably a LF interface and/or HF interface. FIG. 9 shows that optionally the first communication unit 31 may comprise at least one further first communication interface 31.2, preferably a Bluetooth interface. Likewise, the second communication unit 32 can include yet a further second communication interface 32.2, preferably a HF interface and/or a Bluetooth interface. The communication interfaces serve for performing the first and/or second communication via the corresponding communication technology. Furthermore, the communication interfaces can also be electrically connected to corresponding communication parts 35, such as antennas. Thus, the communication device 20 is capable of performing communication, via one or multiple communication technologies, with the identification transmitter 300. In particular, the communication device 200 can of course also only include one single (for example first) communication unit 30, 31 and/or only one single (for example first) communication interface, so that only one single (for example first) communication with the identification transmitter 300 is possible via one single communication technology, for example via ultra-wideband. After that, the information of the communication signals S received from the communication device 20 via the communication parts 35 are transmitted to a processing device 60 of the vehicle 1 via a transmission system 50 of the vehicle 1. The information, such as a distance information, can likewise be transmitted in an encrypted manner here. Optionally, the communication device 20 and/or each (or only one single) communication unit 30 and/or detection device 10 includes at least one encryption device 40 to that end. The encryption device 40 is, for example, formed as an integrated circuit, in particular as a security chip. During transmission via the transmission system 50, the information is transmitted by at least one transmission station 51 of the vehicle 1. The transmission system 50 is formed as a bus system of the vehicle 1, for example. The transmission station 51 is a bus user of the transmission system 50, for example.

For performing the distance determination, the processing device 60 shown in FIGS. 8 and 9 can be used, which, for example, is configured as a central processing device 60 of a central vehicle electronics of the vehicle 1. Thus, the processing device 60 is, for example, centrally provided in the vehicle 1. The processing device 60 can preferably be arranged in the vehicle 1 in a (delimited) distributed manner and comprise multiple components. Alternatively, it is also possible that the processing device 60 is arranged centrally in the vehicle 1 in terms of space, for example as a single component. The components of the communication device 20 and/or of the detection device 10 can preferably be arranged in the vehicle in a distributed manner, wherein the communication units 30 (and/or the respective communication interfaces) can each be arranged and/or formed separately in the vehicle. Here, it is also conceivable, as an alternative, that the communication device 20 and/or the detection device 10 are arranged and/or formed in the vehicle 1 as a spatially-delimited component and/or are arranged and/or formed in the vehicle 1 in a spatially-delimited manner. Thus, the association of the communication units 30 to the communication unit 20 thus preferably corresponds to a strictly functional (logical) association.

Alternatively or in addition, a distance determination can be performed by a detection evaluation unit 11 of the detection device 10 and/or the communication device 20. Furthermore, the detection/evaluation unit 11 and/or the processing device 60 comprises, for example, electronic components such as integrated circuits and/or processors to perform the distance determination and/or an evaluation of the distance information. For the evaluation of the distance information and/or for the distance determination, the processing unit 60 particularly comprises an evaluation device 61. In order that the distance information can be evaluated, it must preferably be decrypted first. To that end, the processing device 60 is electrically, in particular electronically, connected to a decryption device 62. As a matter of fact, the evaluation device 61 can optionally perform the decryption itself, so that no decryption device 62 must be provided. It is also conceivable that the processing device 60 is electrically connected to the data storage unit 63, wherein a digital key information for decryption is digitally stored in the data storage unit 63 in a manner readable to the processing device 60 and/or the evaluation device 61. The digital key information is, for example, a cryptographic key. The evaluation device 61 and/or the decryption device 62 and/or the data storage unit 63 of the processing device 60 can thereby be arranged on a common circuit board and/or be electrically connected to one another, as shown schematically by FIG. 9. In this case, the data storage unit 63 is only optionally to be provided as a separate component, which is illustrated by a dashed line in FIG. 9. Alternatively, the data storage unit 63 can likewise be integrated in the evaluation device 61 and/or in the decryption device 62, for example as a Flash memory.

Figure 10:
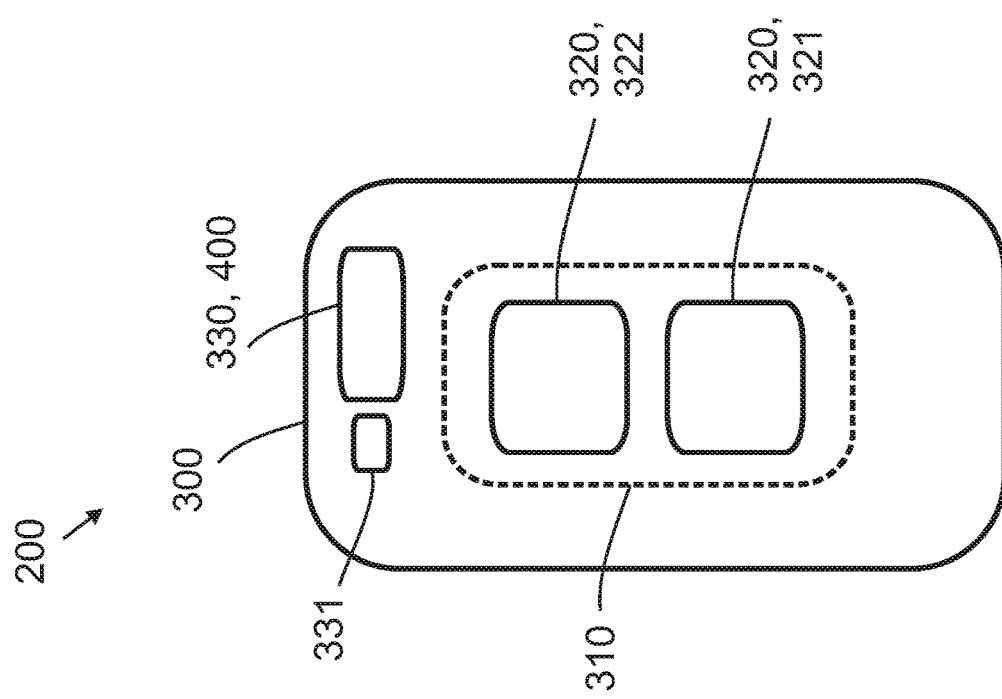

FIG. 10 shows a schematic structure of a mobile identification transmitter 300 of a security system 200 according to the invention. The mobile identification transmitter 300 includes a transceiver device 310, which serves for the communication with the vehicle 1, in particular with the communication device 20. In particular, the transceiver device 310 comprises at least one transceiver unit 320, preferably a first transceiver unit 321 for performing a first communication with the vehicle 1 and a second transceiver unit 322 for performing a second communication with the vehicle 1. Naturally, only one single (for example first) transceiver unit 320, 321 can be provided, so that only one (for example first) communication can be performed. The first transceiver unit 321 is, for example, configured for performing an ultra-wideband communication, and/or the second transceiver unit 322 is configured for performing HF and/or LF communication, for example. In this way, communication signals S, in particular a first communication signal S1 and/or a second communication signal S2, can be wirelessly transmitted to the communication device 20 of the vehicle 1. The transmission can be effected in an encrypted manner, for example, wherein an encryption unit 331 of the identification transmitter 300 is provided and/or electrically connected to the transceiver device 310 (directly or indirectly) to that end. Optionally, it is conceivable that a distance determination is also performed by the identification transmitter 300 based upon the communication signal S. To that end, for example, a processing unit 330 is used as a distance determination device 400.

Figure 11:
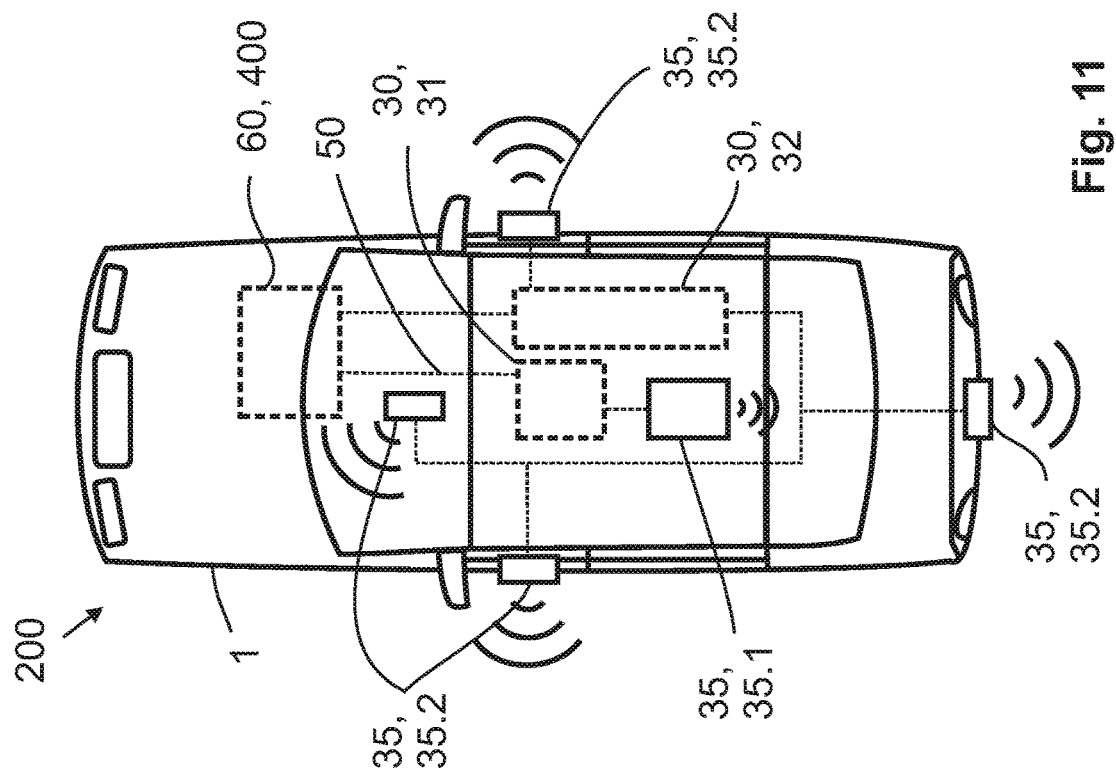

FIG. 11 shows a plan view of a vehicle 1, which comprises a security system 200 according to the invention. The security system 200 includes at least one communication device 20 here, which serves for the communication with an identification transmitter 300. FIG. 11 shows two different communication units 30 of the communication device 20, wherein, naturally, only one single of these communication devices 30 can be provided. In order to emit corresponding communication signals S by means of the communication device 20, the communication device 20 and/or the communication device 30 includes at least one communication part 35, which is formed as an antenna and/or as a satellite. Thus, a first communication part 35.1 can be arranged on a roof of the vehicle 1, for example. Furthermore, it is conceivable that even further communication parts 35, in particular a second communication part 35.2, are arranged on the side region of the vehicle 1 and/or on the roof of the vehicle 1. It is also conceivable that further first communication parts 35.1 are provided on the vehicle 1 in addition to the first communication part 35.1, which in each case serve for the first communication with the identification transmitter 300. To that end, the first communication part 35.1 or each first communication part 35.1 is electrically connected to a first communication unit 31 of the vehicle 1. The second communication part 35.2 or each second communication part 35.2 serves for the second communication by the second communication unit 32 and is electrically connected to the second communication unit 32 of the vehicle 1. The electric connection of the first communication part 35.1 to the first communication unit 31 and/or of the second communication part 35.2 to the second communication unit 32 is effected, for example, via electric lines and/or via a transmission system 50, with the information transmitted via the transmission system 50 being transmitted particularly in an encrypted manner. Alternatively or in addition, it is possible that the electric connection between the first communication unit 31 to the processing device 60 and/or the electric connection of the second communication unit 32 to the processing unit 60 is effected via the transmission system 50. Just as well, the information, in particular the distance information detected by the first communication unit 31, can be transmitted to the processing device 60 via the transmission system 50 in an encrypted manner. The processing device 60 particularly serves as a distance determination device 400 for the (additional) determination, verification and/or evaluation of the distance information. Thus, the security of the distance determination and/or of the evaluation of the distance information can be ensured by the encrypted transmission. The first communication part 35.1 and/or the second communication part 35.2 is/are formed, for example, as an antenna and/or transmitter and/or receiver for the communication, in particular by means of a UWB communication method. Preferably, the first communication part 35.1 and/or the second communication part 35.2 are arranged asynchronously (on the vehicle 1).

Figure 12:
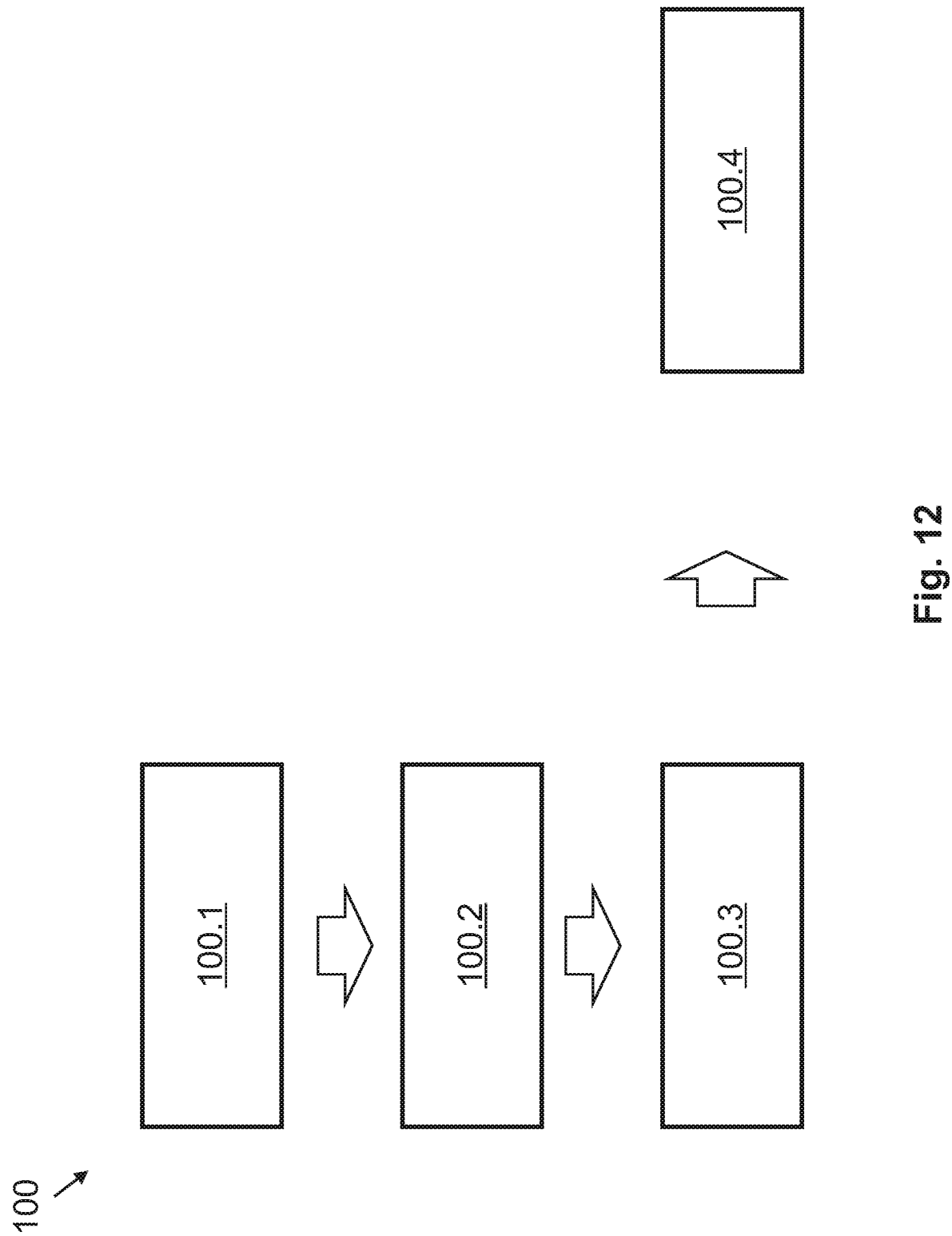

FIG. 12 schematically shows a method 100 according to the invention. According to a first method step 100.1, at least one distance information about a distance A of a mobile identification transmitter 300 to the vehicle 1 is detected by a detection device 10 of the vehicle 1. According to a second method step 100.2, the distance information is transmitted to a, in particular, central processing device 60 of the vehicle 1 by a data transmission from the detection device 10 via a transmission system 50 of the vehicle 1. Furthermore, optionally according to a third method step 100.3, the distance information is evaluated by the processing device 60, whereby a localization of the identification transmitter 300 relative to the at least one security zone Z of the vehicle 1 is effected dependent upon the distance information. According to an optional fourth method step 100.4, a security information for the security system 200 is determined dependent upon the localization.

The above explanation of the embodiments describes the present invention exclusively by way of examples. Individual features of the embodiments can naturally also be freely combined with one another, as far as technically reasonable, without departing from the scope of the present invention.

LIST OF REFERENCE CHARACTERS

1 Vehicle
2 Proximity sensor
10 Detection device
11 Detection evaluation device
20 Communication device
30 Communication unit
31 First communication unit
31.1 Communication interface, ultra-wideband interface
31.2 Communication interface, Bluetooth interface
32 Second communication interface
32.1 Communication interface, LF interface
32.2 Communication interface, HF interface
35 Communication part, antenna
35.1 First communication part
35.2 Second communication part
40 Encryption device
50 Transmission system
51 Transmission station
60 Processing device
61 Evaluation device
62 Decryption device
63 Data storage device
100 Method
100.1 First method step
100.2 Second method step
100.3 Third method step
100.4 Fourth method step
200 Security system
300 Identification transmitter
310 Transceiver device
320 Transceiver unit
321 First Transceiver unit
322 Second transceiver unit
330 Processing unit
331 Encryption unit
400 Distance determination device
A Distance
K Communication field
S Communication signal
S1 First communication signal of a first communication
S2 Second communication signal of a second communication
Z Security zone
Z1 First security zone
Z2 Second security zone
Z3 Third security zone, comfort zone

What is claimed is:

1. A method for an activation of at least one security function of a security system of a vehicle, comprising the following steps:
a) detecting at least one distance information about a distance of a mobile identification transmitter to the vehicle by means of a detection device of the vehicle,
b) transmitting the distance information to a processing device of the vehicle through a data transmission from the detection device via a transmission system of the vehicle,
wherein at least one of the detection device, the processing device, and the transmission system comprises one or more of the following electronic components:
an integrated circuit;
a random number generator;
a microprocessor;
an application specific integrated circuit;
a digital signal processor; and
a correlation receiver
wherein said one or more electronic components are configured to one or more of generate the distance information in an encrypted manner, or evaluate the encrypted distance information, by means of arithmetic information;
and wherein the transmitting step is performed while the distance information is encrypted with the arithmetic information.

2. The method according to claim 1,
wherein
the following steps are carried out after step b):
c) evaluating the distance information by the processing device, whereby a localization of the identification transmitter relative to at least one security zone of the vehicle is effected depending on the distance information, and
d) determining a security information for the security system depending on the localization,
wherein, due to the encryption of the distance information during the transmitting step, the distance information for the localization is protected against unauthorized manipulation.

3. The method according to claim 1,
wherein
the data transmission of the distance information from the detection device via the transmission system to the processing device is carried out in such an at least partially encrypted manner that a decryption for the evaluation of the distance information at least partially transmitted in an encrypted manner by the processing device can only be effected by means of a key information.

4. The method according to claim 1,
wherein
a key information for the decryption is stored in a non-volatile data storage unit of the vehicle in a manner to be protected against a read-out, wherein the non-volatile data storage unit is electrically connected to at least the processing device or a decryption device.

5. The method according to claim 1,
wherein
prior to step a), at least one of the following steps is provided:
performing a distance determination by means of a processing unit of the identification transmitter, whereby the distance information is determined,
transmitting the distance information from the identification transmitter to the detection device of the vehicle, wherein the transmission of the distance information is effected.

6. The method according to claim 1,
wherein
prior to step a), the following step is provided:
performing a distance determination by means of the detection device, preferably by means of a detection evaluation unit of the detection device, whereby the distance information is determined.

7. The method according to claim 1,
wherein
a transmission of the distance information from the identification transmitter at least to the detection device or to the processing device of the vehicle is effected in such an encrypted manner that the identification transmitter performs an encryption based on a first key information, and at least the detection device or the processing device performs the decryption based on a second key information, which is different from the first key information.

8. The method according to claim 1,
wherein
the data transmission according to step b) is effected in such an encrypted manner that the detection device performs an encryption based on a first key information, and the processing device performs the decryption based on a second key information, which is different from the first key information.

9. The method according to claim 1,
wherein
at least one digital key information for the encryption of the distance information is provided and has at least a key length of 10 bit to 10000 bit.

10. The method according to claim 1,
wherein
at least one transmission of the distance information is effected in such an encrypted manner that a key information is changed temporally or alternately or on the basis of a cryptographic algorithm.

11. The method according to claim 1,
wherein
a distance determination is performed by an evaluation of a communication signal for the communication between the identification transmitter and the vehicle, wherein at least the distance or the distance information is determined by the distance determination.

12. The method according to claim 1,
wherein
a distance determination is performed by means of a signal transit time analysis of a communication signal, preferably an ultra-wideband signal, of a communication between a communication unit of the vehicle and a transceiver unit of the identification transmitter.

13. The method according to claim 1,
wherein
at least a communication between the identification transmitter and the vehicle via at least one communication signal is effected as a wireless communication by at least one of the following communication technologies:
BLUETOOTH®,
BLUETOOTH® Low Energy,
ultra-wideband.

14. The method according to claim 1,
wherein
a communication field with a security zone is generated by a communication device of the vehicle.

15. The method according to claim 1, wherein a distance determination is performed by an evaluation of a communication signal for communication between the mobile identification transmitter and the vehicle, wherein the distance information is determined by the distance determination.

16. The method according to claim 15, wherein the distance information already includes the distance.

17. The method according to claim 15, wherein for the detection of the distance information by the detection device, the distance information is determined by the identification transmitter on the basis of a time of flight analysis.

18. The method according to claim 1, wherein the distance information comprises the distance.

19. A security system for a vehicle, comprising:
at least one detection device of the vehicle for the detection of at least one distance information about a distance of a mobile identification transmitter to the vehicle,
at least one processing device of the vehicle for the evaluation of the distance information,
a transmission system of the vehicle for the transmission of the distance information through a data transmission from the detection device to the processing device,
wherein at least one of the detection device, the processing device, and the transmission system comprises one or more of the following electronic components:
an integrated circuit;
a random number generator;
a microprocessor;
an application specific integrated circuit;
a digital signal processor; and
a correlation receiver
wherein said one or more electronic components are configured to one or more of generate the distance information in an encrypted manner, or evaluate the encrypted distance information, by means of arithmetic information;
wherein the data transmission of the distance information can be performed while the distance information is encrypted with the arithmetic information.

20. The security system according to claim 19,
wherein
the detecting device includes a communication device for communication with the identification transmitter with at least two communication units at the vehicle.

21. The security system according to claim 19,
wherein
a second communication unit of the vehicle includes at least a BLUETOOTH® or LF or HF communication interface, which are at least partially different from the communication interfaces of a first communication unit of the vehicle.

22. The security system according to claim 19,
wherein
the transmission system includes at least one bus system, and an encryption device, or is electrically connected to the encryption device.

23. The security system according to claim 19,
wherein
the detection device includes at least one communication part at least for transmitting or receiving electromagnetic waves of a communication signal.

24. The security system according to claim 19,
wherein
at least one communication part is arranged on the roof of the vehicle, wherein the communication part is electrically connected to a communication device of the vehicle.

25. The security system according to claim 19,
wherein
the security system can be operated in accordance with at least a method for an activation of at least one security function of a security system of a vehicle, comprising the following steps: a) detecting at least one distance information about a distance of a mobile identification transmitter to the vehicle by means of a detection device of the vehicle, b) transmitting the distance information to a processing device of the vehicle through a data transmission from the detection device via a transmission system of the vehicle, wherein the data transmission of the distance information is effected while the distance information is encrypted with arithmetic information or includes a mobile identification transmitter for the activation of at least one security function of a security system of a vehicle and for the authentication at the security system of the vehicle, wherein a wireless communication can be performed between the identification transmitter and a communication device of the vehicle, wherein an encryption unit for the encrypted transmission of a distance information is provided.

* * * * *